United States Patent
Sunada (10) Patent No.: US 9,648,146 B2
(45) Date of Patent: May 9, 2017

(54) INFORMATION PROCESSING SYSTEM (71) Applicant: FUJI XEROX CO., LTD., Tokyo (JP)

(72) Inventor: Akira Sunada, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 226 days.

(21) Appl. No.: 14/518,595

(22) Filed: Oct. 20, 2014

(65) Prior Publication Data
US 2015/0373157 A1 Dec. 24, 2015

(30) Foreign Application Priority Data

Jun. 18, 2014 (JP) ................... 2014-125107

(51) Int. Cl.
*H04L 29/06* (2006.01)
*H04L 29/08* (2006.01)

(52) U.S. Cl.
CPC .............. *H04L 69/08* (2013.01); *H04L 67/02* (2013.01); *H04L 67/10* (2013.01); *H04L 67/42* (2013.01)

(58) Field of Classification Search
CPC .......... H04L 69/08; H04L 67/02; H04L 67/42
USPC ....................................... 709/203
See application file for complete search history.

(56) References Cited

U.S. PATENT DOCUMENTS

| 7,805,468 B2* | 9/2010 | Takahashi | G06F 17/30011 707/821 |
| 2007/0233818 A1* | 10/2007 | Kurumai | G06F 17/30893 709/219 |
| 2007/0266057 A1* | 11/2007 | Utsumi | G06F 17/30011 |

FOREIGN PATENT DOCUMENTS

| JP | A-9-114788 | 5/1997 |
| JP | A-2003-263356 | 9/2003 |

* cited by examiner

*Primary Examiner* — Kevin Bates
*Assistant Examiner* — Nazia Naoreen
(74) *Attorney, Agent, or Firm* — Oliff PLC (57) ABSTRACT

An information processing system includes a first server that performs processes in accordance with first operations included in a system of operations for the first server, a second server that performs processes in accordance with second operations included in a system of operations for the second server different from the system of operations for the first server, and a terminal apparatus that requires the first and second servers to perform the processes. The terminal apparatus includes a first requiring portion that requires the first server to perform a process in accordance with at least one of the first operations designated by a user and a converter that converts the at least one first operation into a command set and stores the command set in a storage, the command set including at least one command, which is a part of the process and is performed by the first and second servers.

4 Claims, 5 Drawing Sheets

| TIME | OPERATION | REFLECTION |
|------|-----------|------------|
| ... | ... | DONE |
| ... | ... | UNDONE |
| ... | ... | UNDONE |
| ⋮ | ⋮ | ⋮ |

| TIME | SERVER MACHINE NAME | DOCUMENT NAME | COMMAND | SYNCHRONIZATION INFORMATION |
|---|---|---|---|---|
| ... | ... | ... | ... | ... |
| ... | ... | ... | ... | ... |
| ... | ... | ... | ... | ... |
| ⋮ | ⋮ | ⋮ | ⋮ | ⋮ |

INFORMATION PROCESSING SYSTEM

CROSS-REFERENCE TO RELATED APPLICATIONS

This application is based on and claims priority under 35 USC 119 from Japanese Patent Application No. 2014-125107 filed Jun. 18, 2014.

BACKGROUND

Technical Field

The present invention relates to an information processing system.

SUMMARY

According to an aspect of the invention, an information processing system includes a first server that performs processes in accordance with first operations included in a system of operations for the first server, a second server that performs processes in accordance with second operations included in a system of operations for the second server, which is different from the system of operations for the first server, and a terminal apparatus that requires the first server and the second server to perform the processes. The terminal apparatus includes a first requiring portion that requires the first server to perform a process in accordance with at least one of the first operations designated by a user, and a converter that converts the at least one of the first operations into a command set and stores the command set in a storage, the command set including at least one command, which is a part of the process and is performed by both of the first server and the second server.

BRIEF DESCRIPTION OF THE DRAWINGS

Exemplary embodiments of the present invention will be described in detail based on the following figures, wherein.

DETAILED DESCRIPTION

1. Exemplary Embodiment

1-1. Entire Configuration of Document Management System

Figure 1:
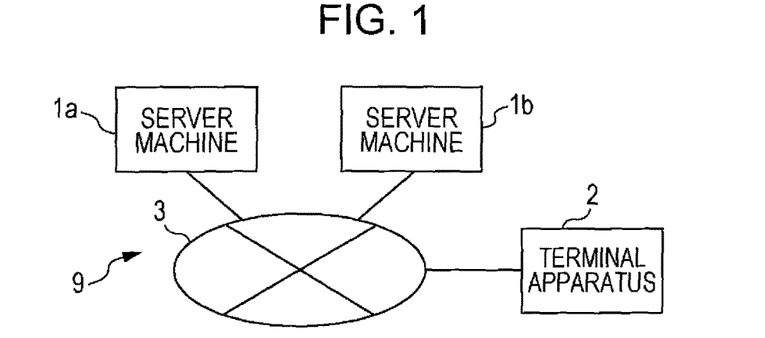
FIG. 1 illustrates the entire configuration of a document management system according to a first exemplary embodiment of the present invention.

FIG. 1 illustrates the entire configuration of a document management system 9 according to a first exemplary embodiment of the present invention. As illustrated in FIG. 1, the document management system 9 includes a server machine 1a, a server machine 1b (hereinafter these machines are collectively called "server machines 1" when they are not particularly required to be distinguished), and a terminal apparatus 2. The server machines 1 and the terminal apparatus 2 are connected together using a communications line 3. The number of server machines 1 are not limited to two and may be three or more. In addition, multiple terminal apparatuses 2 and/or multiple communications lines 3 may be provided.

1-2. Configuration of Server Machine

Figure 2:
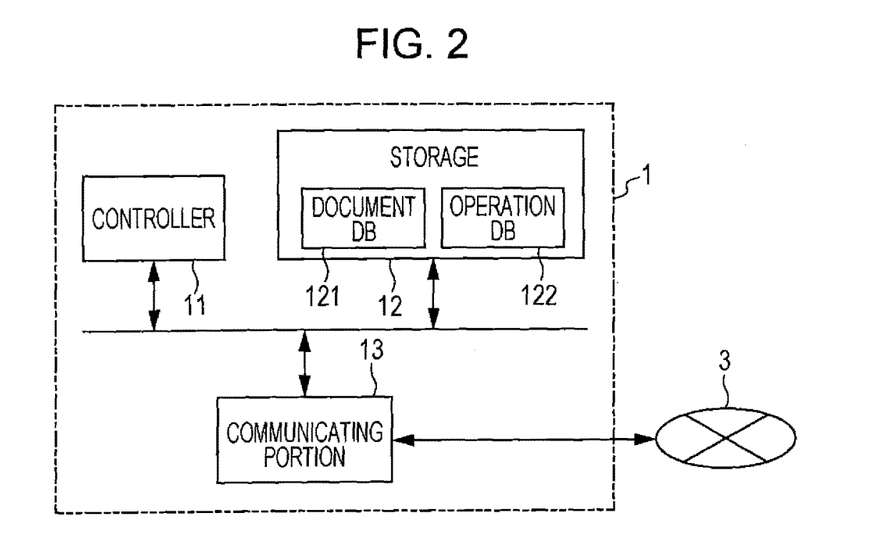
FIG. 2 illustrates the configuration of a server machine.

FIG. 2 illustrates a configuration of the server machine 1. A controller 11 is a unit that controls operations of portions of each server machine 1. The controller 11 includes a processing unit, such as a central processing unit (CPU), and memory devices such as a read only memory (ROM) and a random access memory (RAM). The controller 11 executes programs stored in these memory devices.

A communicating portion 13 is an interface that communicates information with the terminal apparatus 2 through the communications line 3. Examples of the communicating portion 13 include various modems, a wireless communication network in conformity with international mobile telecommunications 2000 (IMT-2000), a serial interface in conformity with the universal serial bus (USB) specification, or a wireless interface in conformity with specifications such as infrared data association (IrDA) or Bluetooth (registered trademark).

A storage 12 is a mass storage unit such as a hard disk in which programs read by the controller 11 are stored. The storage 12 may include a removable disk, that is, a removable recording medium.

The storage 12 includes a document database (a database is abbreviated as "DB" in the drawings) 121 in which documents are stored and an operation database 122 in which operations performed on documents by the terminal apparatus 2 are stored. Each document is stored in the document database 121 while being associated with identification information, such as a document name, for identification of the document.

Documents managed by each server machine 1 included in the document management system 9 are associated with corresponding documents managed by other server machines 1. When a document is formed or updated in one server machine 1a, a document corresponding to the formed or updated document is also formed or updated in another server machine 1b. The content of the document may be stored in each server machine or may be stored in one of the server machines or an external device so as to be accessible from other server machines.

The server machines 1 have different systems of operations. Here, the system of operations means a set of operations provided by each server machine 1. The operations provided by each server machine 1 are capable of being designated by users using a graphical user interface (GUI) and other devices.

The server machine 1a is an example of a first server that performs a process in accordance with a first operation included in a first system of operations. The server machine 1b is an example of a second server that performs a process in accordance with a second operation included in a second system of operations, which is different from the first system of operations.

Figure 3:
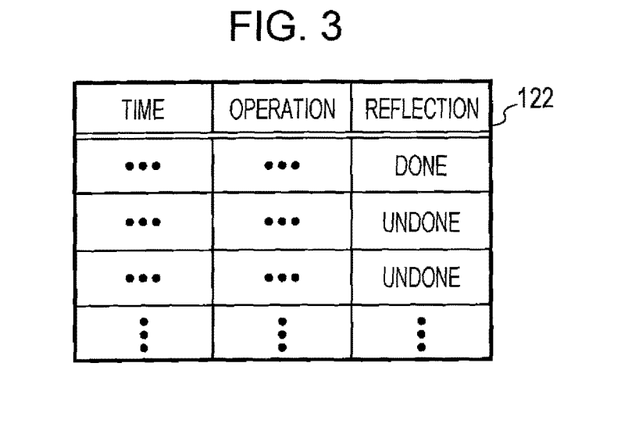
FIG. 3 illustrates an example of an operation database.

FIG. 3 illustrates an example of the operation database 122 that records logs of operations that the server machine 1a has performed on a document managed by itself in response to a request from the terminal apparatus 2. The operation database 122 is a database in which operations that the server machine 1a has performed on a document managed by itself in response to a request from the terminal apparatus 2 are stored in order in which the operations are performed in association with the document. As illustrated in FIG. 3, in the operation database 122, for example, three parameters of "time", "operation", and "reflection" are stored in association with the identifier of a certain document managed by the server machine 1a. In the column of "operation", information on the content of the operation (also referred to as operation information) is described. In the column of "time", information on time at which the operation is performed by the terminal apparatus 2 is described. In the column of "reflection", information is described on whether the operation performed by the server machine 1a in response to a request from the terminal apparatus 2, for example, has been reflected on the server machine 1b in the form of an operation history of a document managed by the document database 121 of the server machine 1b, the document being associated with the performed operation. As will be described below, logs of operations that the server machine 1b has performed on a document managed by itself in response to the terminal apparatus 2 are recorded in the operation database 122 of the server machine 1a as an operation history of the corresponding document managed by the server machine 1a. In this manner, in the operation database 122 of each server machine, operations performed by the server machine itself and operations that other server machines have performed on the corresponding documents are stored in the form of the operation history.

1-3. Functional Configuration of Server Machine

Figure 4:
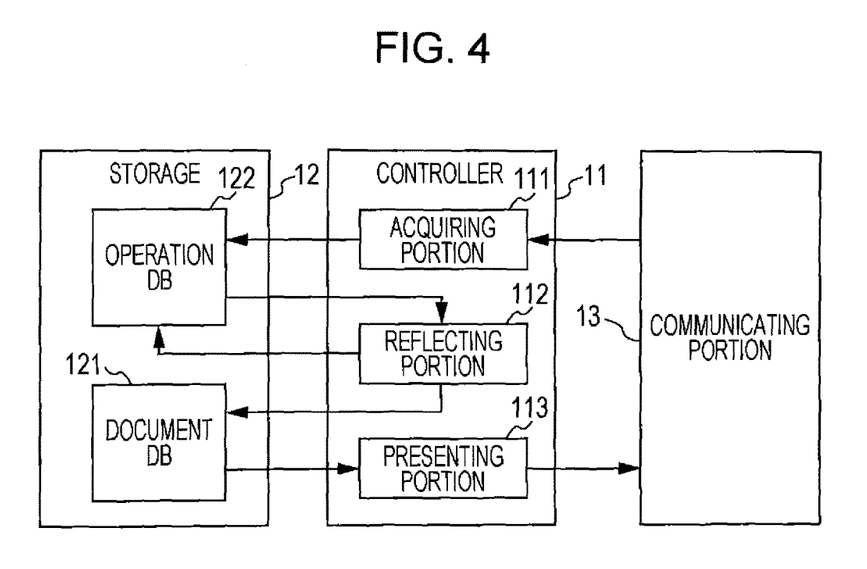
FIG. 4 illustrates a functional configuration of the server machine.

FIG. 4 illustrates an example of a functional configuration of the server machine 1b. The controller 11 of the server machine 1b functions as an acquiring portion 111, a reflecting portion 112, and a presenting portion 113. The acquiring portion 111 acquires, from, for example, the terminal apparatus 2, operation information designating an operation performed by the server machine 1a in response to a command from the terminal apparatus 2 through the communications line 3 and the communicating portion 13.

The reflecting portion 112 stores the acquired operation information of the document managed by the server machine 1a, which has not yet been reflected, as the operation history of the corresponding document managed by the server machine 1b.

The presenting portion 113 retrieves a document registered in the document database 121 in response to a command from the terminal apparatus 2 and provides the document to the terminal apparatus 2 through the communicating portion 13 and the communications line 3.

1-4. Configuration of Terminal Apparatus

Figure 5:
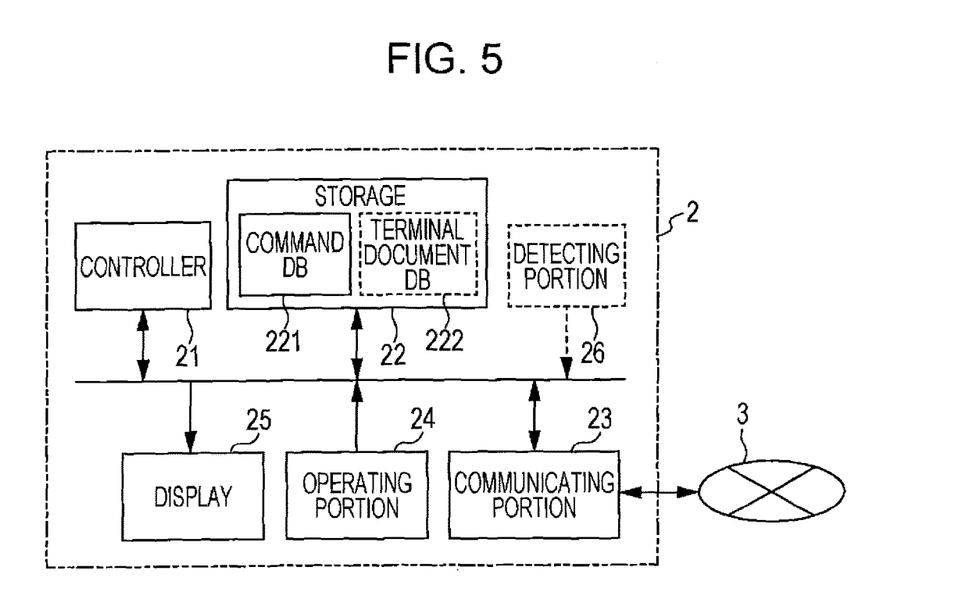
FIG. 5 illustrates the configuration of a terminal apparatus.

FIG. 5 illustrates the configuration of the terminal apparatus 2. A controller 21 is a unit that controls operations of components of the terminal apparatus 2. The controller 21 includes a processing unit, such as a CPU, and memory devices, such as a ROM and a RAM. The controller 11 executes programs stored in these memory devices. The communicating portion 23 is an interface that communicates operation information with the server machines 1 through the communications line 3. Examples of the communicating portion 23 include a wireless communication network in conformity with specifications such as IMT-2000 or IMT-Advanced.

A display 25 is a display device using liquid crystal or the like. The display 25 displays an image in response to a command from the controller 21. An operation portion 24 includes a touch panel and buttons for allowing users to make various commands and provides the controller 21 with signals corresponding to the contents of operations designated by the users. On the basis of the signals provided by the operation portion 24, the controller 21 generates operation information and transmits the operation information to, for example, the server machine 1a through the communicating portion 23.

A storage 22 is a mass storage unit such as a flash memory in which programs read by the controller 21 are stored. The storage 22 may include a removable disk, that is, a removable recording medium.

The storage 22 also includes a command database 221. The command database 221 is a database in which information converted from the operation that each of the multiple server machines 1 is instructed to perform is stored. The stored information is versatile information (also referred to as command information) composing the operation performed by each server machine 1 in response to the instruction, the versatile information being independent from the system of operations of the server machines 1.

Specifically, the command information describes the operation information with a sequence of "commands", which are units in which a process is performed by the server machine 1. The "commands" here are obtained by resolving a process that is performable by each server machine 1 up to a predetermined unit. The predetermined unit is, for example, a unit that is not further resolvable. The operation designated by the operation information is associated with a command set including at least one command. Individual "commands" may not be executable by all the server machines 1 as long as they are executable by any of the server machines 1.

Figure 6:
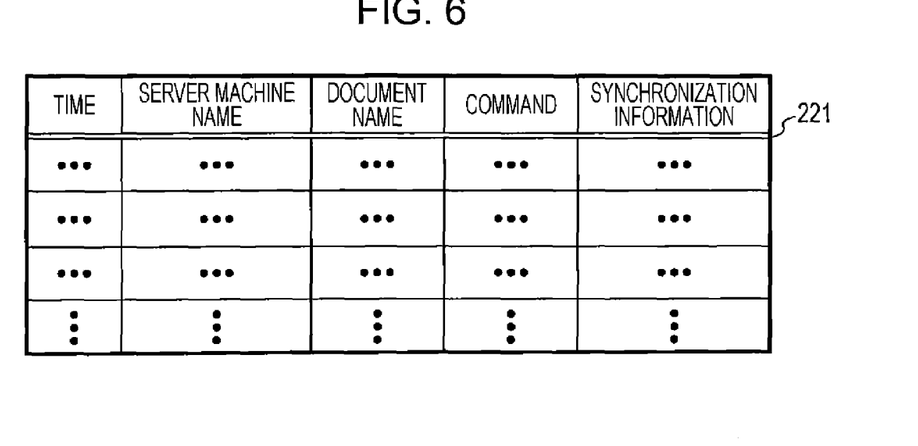
FIG. 6 illustrates an example of a command database.

FIG. 6 illustrates an example of the command database 221. In the command database 221, for example, five parameters of "time", "server machine name", "document name", "command", and "synchronization information" are associated with one another. In the column of "command", the above-described command information corresponding to the operation performed on the terminal apparatus 2 is described. In the column of "time", information on time at which the operation is performed by server machines 1 (or instructed on the terminal apparatus 2) is described. In the column of "server machine name", the name or the identification information of the server machine 1 (for example, the server machine 1a) that the terminal apparatus 2 has required to perform the operation is described. In the column of "document name", the name or the identification information of the document on which the operation is performed on the terminal apparatus 2 is described. In the column of "synchronization information", information is described on whether the history information on the operations performed on the document managed by one server machine 1 in response to the above-described users' operations has been synchronized with the history information on the operation performed on the corresponding document managed by another server machine 1 (for example, the server machine 1b).

1-5. Functional Configuration of Terminal Apparatus

Figure 7:
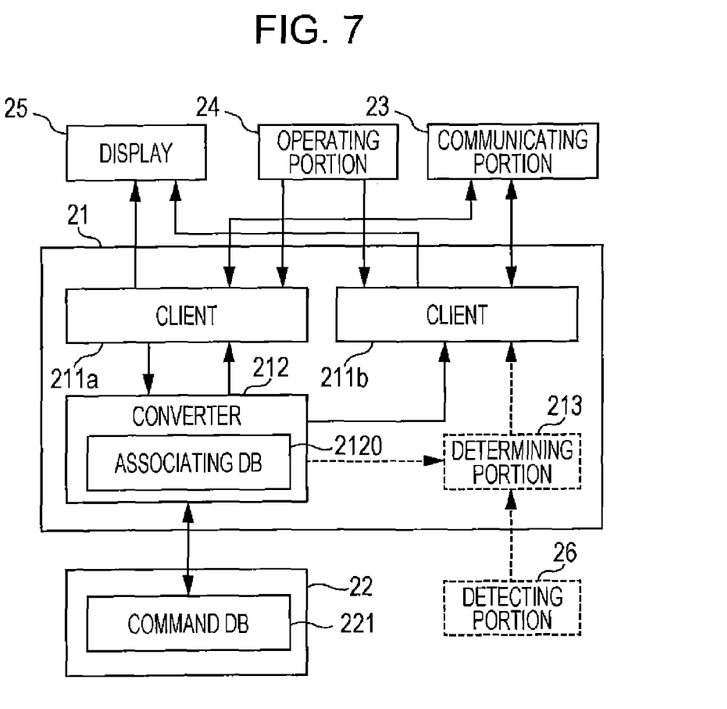
FIG. 7 illustrates a functional configuration of the terminal apparatus.

FIG. 7 illustrates the functional configuration of the terminal apparatus 2. The controller 21 of the terminal apparatus 2 functions as a client 211a, a client 211b (hereinbelow, these clients are collectively referred to as "clients 211" when they are not particularly required to be distinguished) and a converter 212.

The client 211a is a client application for operating a document stored in the server machine 1a. A user's operation received by the operation portion 24 while the client 211a is being executed is construed by the client 211a as an instruction on an operation that is to be handled by the server machine 1a. The client 211a then generates operation information (i.e., instruction) designating the content of the construed operation and transmits the operation information to the server machine 1a through the communicating portion 23. By transmitting the operation information to the server machine 1a, the client 211a requires the server machine 1a to perform a process in accordance with the user's operation. Specifically, the client 211a is an example of a first requiring portion that requires the first server to perform a process in accordance with the first operation designated by the user.

The client 211b, on the other hand, is a client application for operating a document stored in the server machine 1b. A user's operation received by the operation portion 24 while the client 211b is being executed is construed by the client 211b as an operation that is to be handled by the server machine 1b. The client 211b then generates operation information (i.e., instruction) designating the content of the construed operation and transmits the operation information to the server machine 1b through the communicating portion 23.

A converter 212 converts the operation information that, for example, a client 211 has transmitted to the server machine 1a into command information on the basis of an associating database 2120 and stores the command information in the command database 221 of the storage 22. Specifically, the converter 212 is an example of a converter that converts the first operation corresponding to the process required to be performed by the first requiring portion into a command set and that stores the command set in the storage. The command set includes one or more commands, which are units in which the first server and the second server perform processes. In other words, the command is a part of the process which is performed by the server machine 1a in response to the operation information designated by the client 211a.

The converter 212 retrieves command information stored in the command database 221, converts the command information into the operation information (inversely converts) designating the operation that is to be handled by the server machine 1b that has not yet stored the history of the corresponding operation, and transmits the operation information to the server machine 1b. Specifically, the converter 212 is an example of a converter that converts a command set stored in the storage into the corresponding second operation in the second system of operations for the server machine 1b.

Figure 8:
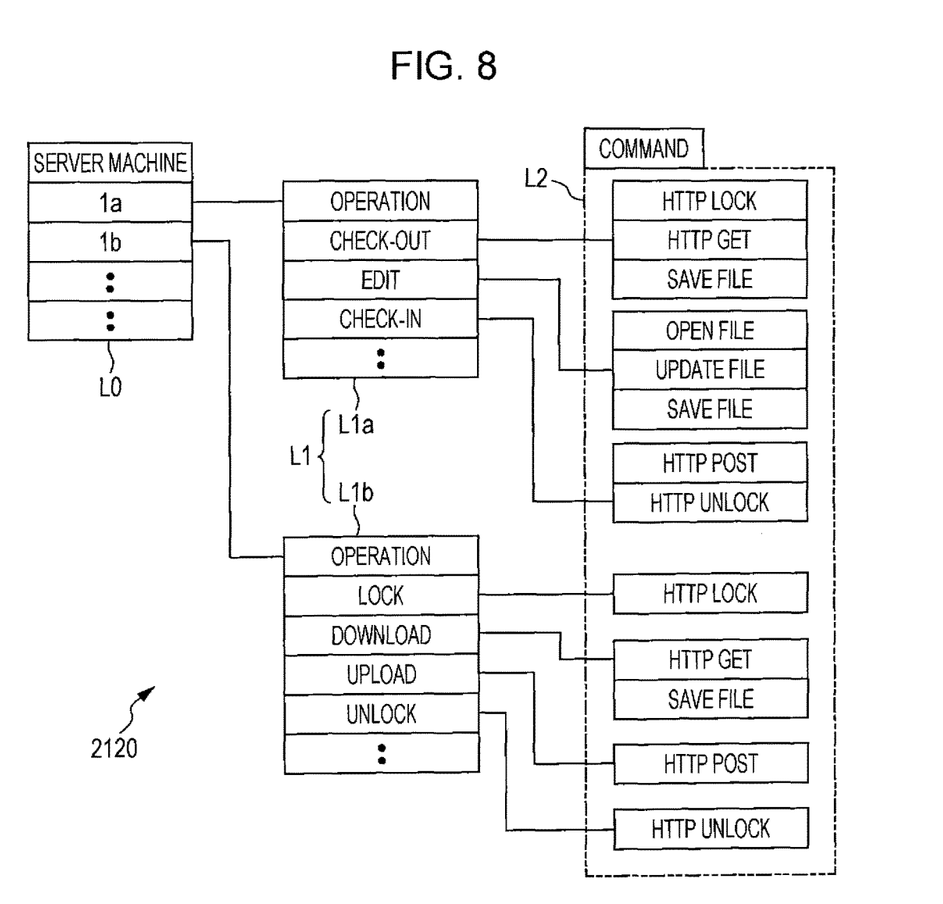
FIG. 8 illustrates an example of an associating database.

Here, the associating database 2120 is a database included in the converter 212. FIG. 8 illustrates an example of the associating database 2120. The associating database 2120 includes a server machine name list L0, an operation information list L1a and an operation information list L1b (hereinbelow, these operation information lists are collectively referred to as "operation information lists L1" when they are not particularly required to be distinguished), and a command information list L2. The server machine name list L0 is a list of names of the server machines 1 associated with the clients 211. The operation information lists L1 contain the operations that each client 211 is capable of transmitting to the server machine 1a and the server machine 1b. The command information list L2 lists the contents of the operations in the form of command information that is independent of the server machines 1.

As illustrated in FIG. 8, each server machine name listed on the server machine name list L0 is associated with the corresponding operation information list L1 that lists operations handled by the server machine 1 included in the server machine names. Each operation listed on the operation information lists L1 is associated with the command information listed on the command information list L2.

For example, an operation of "CHECK-OUT" among the operations handled by the server machine 1a is associated with a command set including three commands arranged in the sequence of "HTTP LOCK", "HTTP GET", to "SAVE FILE". Such a command set is command information. Here, the operation of "CHECK-OUT" is handled by the server machine 1a but not by the server machine 1b. On the other hand, some of the commands constituting the command information are included in the command information corresponding to the operation handled by the server machine 1b. Thus, by converting the operation information designating the operation handled by the server machine 1a into the command information and later inversely converting the converted command information into the operation information designating the operation handled by the server machine 1b, the operation in the server machine 1a is converted into the operation in the server machine 1b. In the case where some of the commands in the command information are not associated with the operations in the server machine 1b when the command information is to be inversely converted, such commands may be ignored.

For example, the above-described command information includes commands arranged in the sequence of "HTTP LOCK", "HTTP GET", to "SAVE FILE". Among these commands, "HTTP LOCK" is associated with the operation of "LOCK" handled by the server machine 1b. A command set arranged in the sequence of "HTTP GET" to "SAVE FILE" is associated with the operation of "DOWNLOAD" handled by the server machine 1b. Thus, the converter 212 converts the operation of "CHECK-OUT" performed on the server machine 1a into the command information and then inversely converts the command information into the operations of "LOCK" and "DOWNLOAD" for the server machine 1b.

When an operation of "EDIT" is performed on the server machine 1a, the converter 212 converts the operation into a command set including three commands arranged in the sequence of "OPEN FILE", "UPDATE FILE", to "SAVE FILE". When the converter 212 is to inversely convert this command set into the operation information for the server machine 1b, the converter 212 refers to the associating database 2120 and determines that the corresponding operation information does not exist and ignores this command set.

Figure 9:
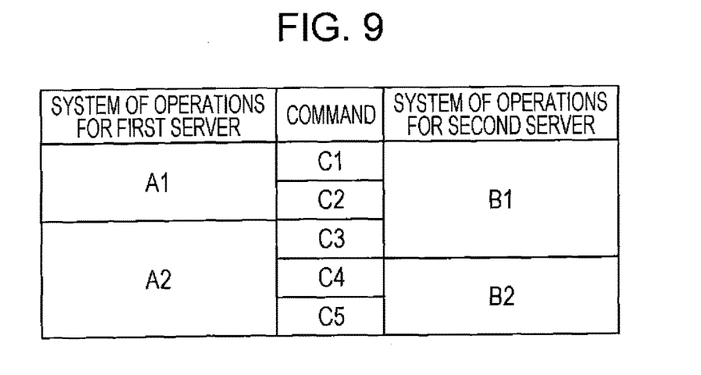
FIG. 9 illustrates an example of an association relationship between operation information of different systems of operations and command information.

FIG. 9 illustrates an example of the association relationship between the operation information of different systems of operations and the command information (a command set). As illustrated in FIG. 9, when a process including two consecutive operations of "A1" to "A2" is performed on a document managed by the server machine 1a in the first system of operations used in the server machine 1a, the converter 212 converts the operation of "A1" into a command set arranged in the sequence of "C1" to "C2" and the operation of "A2" into a command set arranged in the sequence of "C3", "C4", to "C5" referring to the associating database 2120 and stores the command sets in the command database 221.

When the converter 212 stores the history of the process corresponding to the above-described process as the history of the document corresponding to the document managed by the server machine 1b, the converter 212 retrieves a command set stored in the command database 221 and inversely converts the command set into the operation information in accordance with the second system of operations referring to the associating database 2120. The associating database 2120 describes that the operation "B1" in the second system of operations is associated with a command set arranged in the sequence of "C1", "C2", to "C3" and that the operation "B2" in the second system of operations is associated with a command set arranged in the sequence of "C4" to "C5". Thus, the converter 212 inversely converts a command set arranged in the sequence of "C1", "C2", "C3", "C4", to "C5" into operation information designating two consecutive operations of "B1" to "B2". The controller 21 transmits the inversely converted operation information to the server machine 1b and requires the server machine 1b to store the operation information as the process history. The inversely converted operation information is stored in the server machine 1b as the process history of a document managed by the server machine 1b corresponding to the document operated and managed by the server machine 1a. As described in detail below, the documents themselves (content information) of the server machines 1a and 1b on which these operations are performed are synchronized with each other without using the terminal apparatus 2.

As described above, the operation information designating the operation performed on the server machine 1a is converted into command information and, by inversely converting the command information, operation information designating the corresponding operation for the server machine 1b on which the performed operations are not reflected are generated. As described above, although a single operation in a certain system of operations may not be associated with a single operation of another system of operations, multiple operations in a certain system of operations may be associated with multiple operations of another system of operations. The terminal apparatus 2 thus associates operation information between different systems of operations by converting the operation information into the command information. In the case where the operation information associated with the command information does not exist, operation information designating the corresponding operation for the server machine 1b is not generated and the operation is not stored as the process history in the server machine 1b.

1-6. Operation of Document Management System

Figure 10:
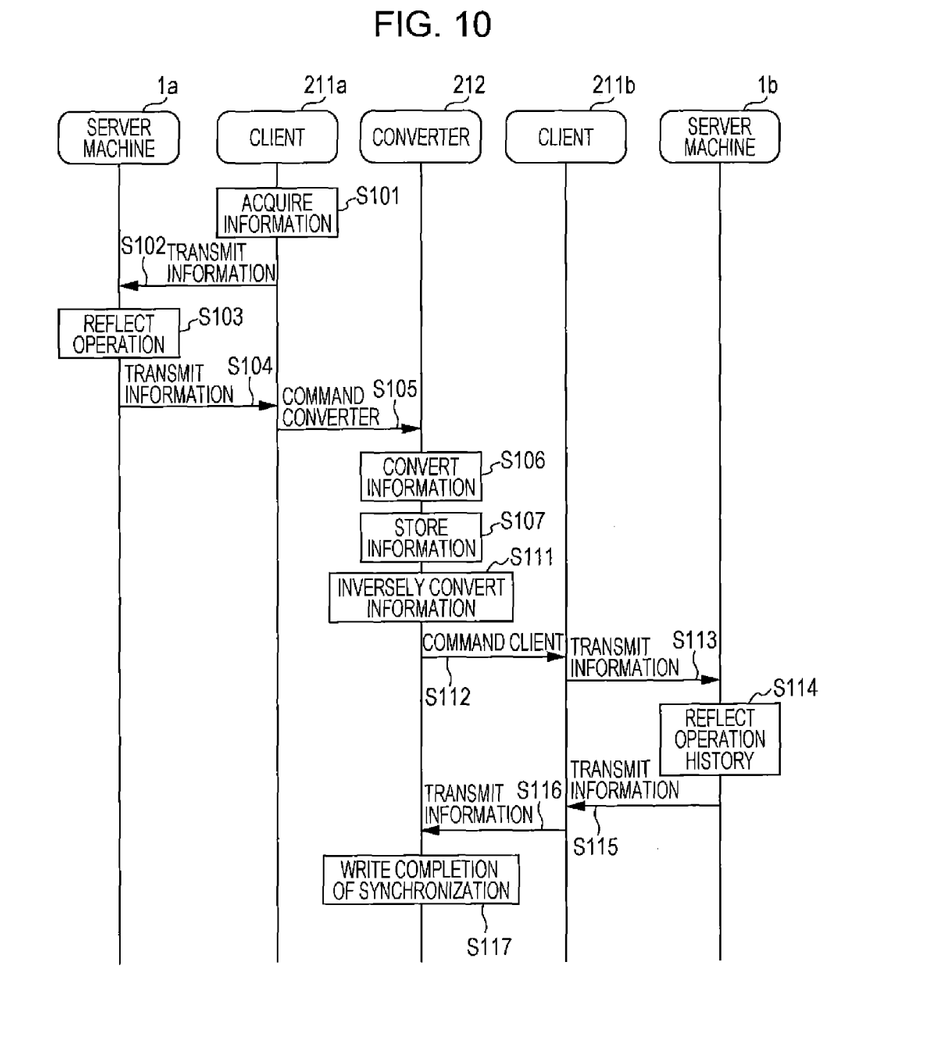
FIG. 10 is a sequence chart illustrating an operation flow of the document management system.

FIG. 10 is a sequence chart illustrating the operation flow of the document management system 9. The controller 21 of the terminal apparatus 2 is executing the client 211a, the client 211b, and the converter 212. When the client 211a acquires operation information designating a user operation received at the operation portion 24 (Step S101), the client 211a transmits the acquired operation information to the server machine 1a (Step S102).

The server machine 1a stores the transmitted operation information in the operation database 122, performs a process on the basis of the command corresponding to the operation information, and reflects the above-described user operation on a document stored in the document database 121 (Step S103). Then, the server machine 1a transmits information of the fact that the operation has been reflected on the document to the terminal apparatus 2 (Step S104).

When the terminal apparatus 2 receives information of the fact that the operation has been reflected on the document, the client 211a executed on the terminal apparatus 2 commands the converter 212 to convert the operation information designating the operation into the command information (Step S105). Following the command, the converter 212 converts the operation information into command information (Step S106) and stores the command information in the command database 221 (Step S107).

In the case where the terminal apparatus 2 causes the server machine 1b to store the above-described operation history triggered by an event such as reception of a command from a user, a lapse of a predetermined period, or reception of a request from the server machine 1a, the converter 212 inversely converts the command information stored in the command database 221 into operation information of the operation handled by the server machine 1b (Step S111) and instructs the client 211b to store the operation information obtained by the inverse conversion as a process history in the server machine 1b (Step S112). The client 211b transmits the instructed operation information to the server machine 1b and requires the server machine 1b to store the operation information as a process history (Step S113). In other words, the client 211b is an example of a second requiring portion that requires the second server to store the second operation converted by the converter 212 as a process history.

In the case where the server machine 1a fails to be synchronized with the server machine 1b beyond a predetermined period due to poor communication conditions, the server machine 1a may make the above-described request.

The server machine 1b stores the operation information transmitted from the terminal apparatus 2 in the operation database 122 as a process history of a document that the server machine 1b manages and reflects the process history of the document managed by the server machine 1a on the process history of the document managed by itself (Step S114). Here, the server machine 1b may reflect the operation designated by the operation information transmitted from the terminal apparatus 2 on the content of the document that the server machine 1b manages or may receive the document on which the operation has been reflected from the server machine 1a. After the server machine 1b reflects the operation information transmitted from the terminal apparatus 2 on the process history of the document managed by itself, the server machine 1b transmits a notice of the completion of the reflection to the terminal apparatus 2 (Step S115).

When the client 211b in the terminal apparatus 2 receives the above-described notice from the server machine 1b, the client 211b transmits the notice to the converter 212 (Step S116). Upon receipt of the notice, the converter 212 describes the completion of the synchronization of the process history of the document managed by the server machine 1b into the "synchronization information" column in the command database 221 (Step S117). Here, the terminal apparatus 2 may notify the server machine 1a of the completion of the synchronization of the process history. Upon receipt of the notice, the server machine 1a describes the completion of the reflection of the synchronization of the operation history into the "reflection" column of the operation database.

As described above, this document management system 9 includes multiple server machines 1 having different system of operations that are performed on respective documents. Each operation is resolved into commands, which are units in which the server machines 1 perform processes, to be stored as command information. Thus, compared to a configuration different from this configuration, the rate at which an operation performed by one server machine 1 is converted into an operation for another server machine 1 is higher, whereby the process histories of different documents managed by different server machines is capable of being more easily synchronized with each other.

2. Modified Example

Although an exemplary embodiment has been described thus far, the content of the exemplary embodiment may be modified in the following manners. In addition, the modified examples described below may be combined together.

2-1. Modified Example 1

In the above-described exemplary embodiment, an operation performed on the terminal apparatus 2 is reflected on a document stored in a server machine 1. However, the operation may also be reflected on a document stored in the terminal apparatus 2. In this case, the storage 22 of the terminal apparatus 2 may include a terminal document database 222 as illustrated with a broken line in FIG. 5. The terminal document database 222 is a database in the terminal apparatus 2 in which a reflected document is stored at the same time as when an operation received at the operation portion 24 of the terminal apparatus 2 is reflected on a document stored in the server machine 1. The operation is reflected on the document stored in the terminal document database 222 in such a manner that the document stored in the terminal document database 222 is synchronized with a document stored in the document database 121 of the server machine 1. Thus, the document stored in the terminal document database 222 functions as a backup of the document managed by the server machine 1. In this modified example, the association relationship between the documents stored in the document database 121 of the server machine 1 and the documents stored in the terminal document database 222 may be described in the command database 221.

2-2. Modified Example 2

In the above-described exemplary embodiment, reception of a command from a user, a lapse of a predetermined period, and reception of a request from the server machine 1a are described as examples of the event that triggers an operation performed on the server machine 1a that the terminal apparatus 2 has received at the operation portion 24 to be reflected on the server machine 1b. However, the reflection may be performed after the terminal apparatus 2 has detected a certain phenomenon and in accordance with the result of detection.

For example, the terminal apparatus 2 includes a detecting portion 26 as illustrated with a broken line in FIG. 5. The detecting portion 26 is a detecting device that detects a certain physical quantity in the environment surrounding the terminal apparatus 2. For example, the detecting portion 26 may be a camera (an image capturing device) including a photoelectric element that detects surrounding light.

In this case, the controller 21 of the terminal apparatus 2 functions as a determining portion 213 (see FIG. 7) that determines, on the basis of the detection results of the detecting portion 26, whether the operation performed on the server machine 1a is to be reflected on the server machine 1b. For example, in the case where the detecting portion 26 is an image capturing device, the controller 2 compares the tone or the brightness of the captured image or other parameters, such as the mean value or the median value of the tone or the brightness, with the threshold and determines whether the reflection is to be performed on the basis of the image, which is a detection result.

Alternatively, the detecting portion 26 may be a position finding device that detects radio waves from a navigation satellite and finds the position of the terminal apparatus 2 on the basis of a global navigation satellite system (GNSS).

In this case, the controller 21 of the terminal apparatus 2 specifies the location of the terminal apparatus 2 on the basis of the detection result of the detecting portion 26 and determines, on the basis of the location, whether the reflection is to be performed. The detection of the detecting portion 26 may be performed when the operation portion 24 receives an operation from a user.

Alternatively, the detecting portion 26 may detect the radio field intensity of the radio waves that the communicating portion 23 receives or the communication conditions under which the communicating portion 23 receives radio waves. In this case, the controller 21 of the terminal apparatus 2 specifies the type of a communications line 3 usable by the terminal apparatus 2 on the basis of the detection result of the detecting portion 26 and determines whether the reflection is to be performed in accordance with the type of the communications line 3. For example, in the case where the specified type of the communications line 3 is a communications line 3 that enables communications in a bandwidth exceeding a predetermined bandwidth, the controller 21 may determine to perform the above-described reflection.

2-3. Modified Example 3

In the above-described exemplary embodiment, when the client 211a executed on the terminal apparatus 2 acquires operation information designating a user operation received at the operation portion 24, the client 211a transmits the acquired operation information to the server machine 1a. This transmission may be performed at any of various different timings. Examples of the timings include the time when a user commands transmission and the time when the client 211a connects with the server machine 1a. Alternatively, the transmission may be performed at the time when the client 211a connects with the server machine 1a with an efficiency that is higher than a predetermined efficiency. Here, the predetermined efficiency is expressed by, for example, communications traffic per unit time. Specifically, for example, when the terminal apparatus 2 connects with the server machine 1a using a communications line 3 that enables communications in a bandwidth exceeding a predetermined bandwidth, the client 211a may transmit the above-described operation information to the server machine 1a.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system, comprising:
   a first server that performs processes in accordance with first operations included in a system of operations for the first server;
   a second server that performs processes in accordance with second operations included in a system of operations for the second server, which is different from the system of operations for the first server; and
   a terminal apparatus that requires the first server and the second server to perform the processes,
   wherein the terminal apparatus includes
      a first requiring portion that requires the first server to perform a process in accordance with at least one of the first operations designated by a user, and
      a converter that converts the at least one of the first operations into a command set and stores the command set in a storage, the command set including at least one command, which is a part of the process and is performed by both of the first server and the second server, the converter retrieves the command set stored in a command database and further inversely converts the command set into operation information in accordance with the system of operations for the second server that has not yet stored a history of the corresponding operation.

2. The information processing system according to claim 1,
   wherein the converter converts the command set stored in the storage into corresponding one or more of the second operations included in the system of operations for the second server, and
   wherein the terminal apparatus includes a second requiring portion that requires the second server to store the corresponding one or more second operations as a process history.

3. The information processing system according to claim 1,
   wherein the first server and the second server are document management servers, and
   wherein a second document, which is managed by the second server and corresponds to a first document which is managed by the first server, is replaced by the first document on which the process has been performed in accordance with the at least one of the first operations.

4. The information processing system according to claim 2,
   wherein the terminal apparatus includes a detecting portion that detects a physical quantity from an environment surrounding the terminal apparatus, and
   wherein the second requiring portion requires the second server to store the corresponding one or more of the second operations as the process history in accordance with a result of detection of the detecting portion.

* * * * *